United States Patent
Kim et al.

(10) Patent No.: US 10,481,457 B2
(45) Date of Patent: Nov. 19, 2019

(54) ELECTROCHROMIC DEVICE AND MANUFACTURING METHOD THEREFOR

(71) Applicant: LG CHEM, LTD., Seoul (KR)

(72) Inventors: Yong Chan Kim, Daejeon (KR); Ki-Hwan Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/307,833

(22) PCT Filed: Jul. 6, 2017

(86) PCT No.: PCT/KR2017/007239
§ 371 (c)(1),
(2) Date: Dec. 6, 2018

(87) PCT Pub. No.: WO2018/009001
PCT Pub. Date: Jan. 11, 2018

(65) Prior Publication Data
US 2019/0258127 A1 Aug. 22, 2019

(30) Foreign Application Priority Data

Jul. 7, 2016 (KR) .................. 10-2016-0086251

(51) Int. Cl.
*G02F 1/15* (2019.01)
*G02F 1/155* (2006.01)
(Continued)

(52) U.S. Cl.
CPC ............. *G02F 1/155* (2013.01); *C01G 39/00* (2013.01); *C01G 41/02* (2013.01); *G02F 1/1524* (2019.01);
(Continued)

(58) Field of Classification Search
CPC ... G02F 1/155; G02F 1/1524; G02F 2001/164
See application file for complete search history.

(56) References Cited

U.S. PATENT DOCUMENTS

2007/0058237 A1* 3/2007 Appelfeller ............. G02F 1/157
359/267
2008/0070062 A1 3/2008 Jenninger et al.
(Continued)

FOREIGN PATENT DOCUMENTS

| CN | 101833211 A | 9/2010 |
| CN | 104880884 A | 9/2015 |

(Continued)

OTHER PUBLICATIONS

International Search Report issued in PCT/KR2017/007239 (PCT/ISA/210), dated Oct. 19, 2017.
(Continued)

*Primary Examiner* — Joseph P Martinez
(74) *Attorney, Agent, or Firm* — Birch, Stewart, Kolasch & Birch, LLP

(57) ABSTRACT

An electrochromic device, the electrochromic device including a substrate; a first electrode provided on the substrate; an ion storage layer provided on the first electrode; a polymer electrolyte layer provided on the ion storage layer; an electrochromic layer provided on the polymer electrolyte layer; and a second electrode provided on the electrochromic layer, wherein the ion storage layer includes $Mo_aTi_bO_xN_y$, and a, b, x and y are the same as or different from each other and each independently is a real number of greater than or equal to 0.5 and less than or equal to 60. Also included is a method for manufacturing an electrochromic device.

12 Claims, 2 Drawing Sheets

(51) Int. Cl.
*C01G 39/00* (2006.01)
*C01G 41/02* (2006.01)
*G02F 1/1524* (2019.01)
*E06B 9/24* (2006.01)

(52) U.S. Cl.
CPC ............ *C01P 2006/40* (2013.01); *E06B 9/24* (2013.01); *E06B 2009/2464* (2013.01); *G02F 2001/164* (2019.01)

(56) References Cited

U.S. PATENT DOCUMENTS

| | | |
|---|---|---|
| 2014/0133007 A1 | 5/2014 | Granqvist |
| 2015/0198856 A1 | 7/2015 | Lee et al. |
| 2015/0378234 A1 | 12/2015 | Konkin et al. |
| 2016/0026058 A1 | 1/2016 | Lee et al. |

FOREIGN PATENT DOCUMENTS

| | | |
|---|---|---|
| KR | 10-2012-0072190 A | 7/2012 |
| KR | 10-2013-0066755 A | 6/2013 |
| KR | 10-2014-0020443 A | 2/2014 |
| KR | 10-2014-0051165 A | 4/2014 |
| KR | 10-2015-0085213 A | 7/2015 |
| KR | 10-2016-0011338 A | 2/2016 |
| KR | 10-2016-0079174 A | 7/2016 |

OTHER PUBLICATIONS

Andersson et al., "Electrochromic $Li_xWO_3$/polymer laminate/$Li_YV_2O_5$ device: toward an all-solid-state smart window," Applied Optics, vol. 28, No. 15, Aug. 15, 1989, pp. 3295-3302.

Extended European Search Report for European Application No. 17824557.7, dated Mar. 11, 2019.

* cited by examiner

[FIG. 1]
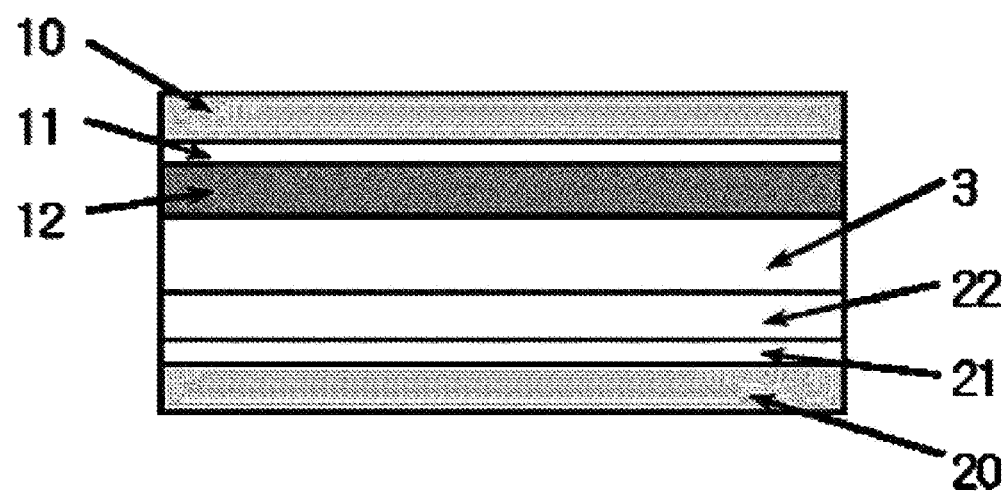
[FIG. 2]
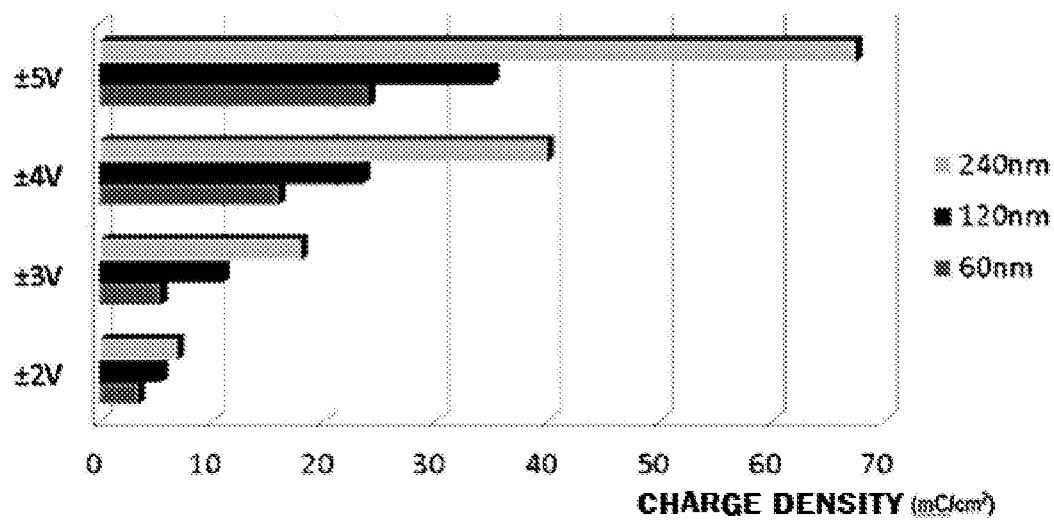

[FIG. 3]
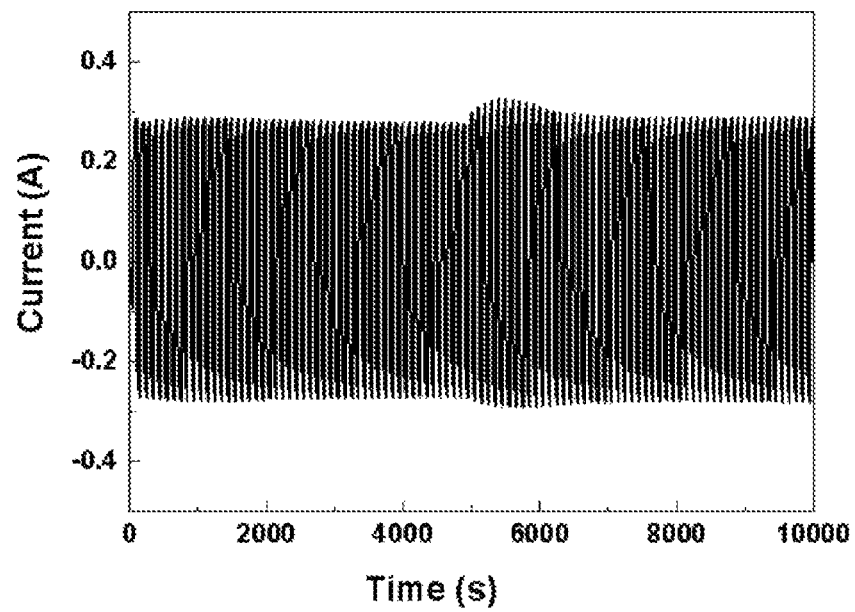
[FIG. 4]
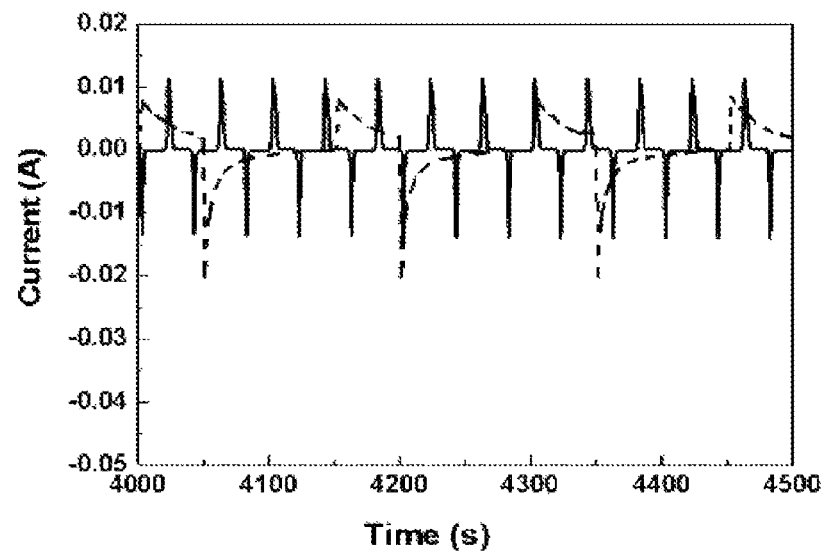

ELECTROCHROMIC DEVICE AND MANUFACTURING METHOD THEREFOR

TECHNICAL FIELD

The present specification claims priority to and the benefits of Korean Patent Application No. 10-2016-0086251, filed with the Korean Intellectual Property Office on Jul. 7, 2016, the entire contents of which are incorporated herein by reference.

The present disclosure relates to an electrochromic device and a method for manufacturing the same.

BACKGROUND ART

Electrochromism refers to properties that colors of a material change reversibly while electron density changes with intercalation or deintercalation of cations in an electrode structure by an electrochemical oxidation/reduction reaction occurring from changes in the applied voltage.

Transition metal oxides such as $WO_3$, $V_2O_5$, $TiO_2$ and NiO exhibit hybrid conduction properties capable of ion and electron conduction. In an electrolyte, when applying specific potential to an interface between a thin film electrode of these transition metal oxides and the electrolyte, atoms such as $H^+$, $Na^+$ or $Li^+$ are charged or discharged. Herein, a coloring-bleaching process accompanies during the charge and discharge process, and therefore, extensive studies have been conducted as an electrode material of an electrochemical coloring device. A display device using such an electro-coloring phenomenon is capable of obtaining light transmittance at a target level by changing applied potential from the outside, and therefore, the use in electrochemical coloring display devices having a special glass type such as a curtainless window, or a mirror type is expected.

A structure of an electrochromic device is schematically illustrated in FIG. 1. More specifically, it is a structure in which a first electrode (11), a $WO_3$ thin film (12), an electrolyte layer (3), a LiNiOx thin film (22), a second electrode (21) and a second substrate (20) are consecutively laminated on a first substrate (10).

The $WO_3$ thin film (12) is normally formed through a sputtering process, a chemical vapor deposition (CVD) or sol-gel method. As the electrolyte layer (3), a solid or liquid state may be used.

When applying a voltage between the first electrode (11) and the second electrode (21), ions inside the electrolyte layer (3) migrate and are discolored in the $WO_3$ thin film by reacting as in the following chemical formula.

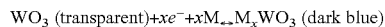

$WO_3$ (transparent)+$xe^-$+$xM_+$→$M_xWO_3$ (dark blue)

Herein, cations in the electrolyte layer (3) migrate through cracks in the $WO_3$ thin film (12) or a free volume, and in order to increase the degree of coloring, the $WO_3$ thin film (12) needs to be thick, which causes a problem of decreasing the discoloration rate as the migration distance of the cations increases.

In addition, in forming an electrochromic device, a $WO_3$ thin film has been prepared using a sputtering method. However, the sputtering method has a problem of being not suitable for mass production since process apparatuses are high-priced and deposition speeds are too slow to prepare a $WO_3$ thin film having a few hundred nm thickness.

DISCLOSURE

Technical Problem

The present disclosure is directed to providing an electrochromic device and a method for manufacturing the same.

Technical Solution

One embodiment of the present specification provides an electrochromic device including a substrate; a first electrode provided on the substrate; an ion storage layer provided on the first electrode; a polymer electrolyte layer provided on the ion storage layer; an electrochromic layer provided on the polymer electrolyte layer; and a second electrode provided on the electrochromic layer, wherein the ion storage layer includes $Mo_aTi_bO_xN_y$, and a, b, x and y are the same as or different from each other and each independently a real number of greater than or equal to 0.5 and less than or equal to 60.

Another embodiment of the present specification provides a method for manufacturing an electrochromic device including forming a first electrode on a substrate; forming an ion storage layer on the first electrode; forming an electrochromic layer on a second electrode; and forming a polymer electrolyte layer between the ion storage layer and the electrochromic layer, wherein the ion storage layer includes $Mo_aTi_bO_xN_y$, and a, b, x and y are the same as or different from each other and each independently a real number of greater than or equal to 0.5 and less than or equal to 60.

Advantageous Effects

An electrochromic device according to one embodiment of the present disclosure exhibits high charge density, and has excellent electrochemical durability under a high voltage.

In addition, the electrochromic device according to one embodiment of the present disclosure is capable of reducing costs and enhancing productivity compared to electrochromic devices using existing materials known in the art.

The electrochromic device according to one embodiment of the present disclosure has high charge density and thereby can be formed to have a large area, and has a reduced switching time.

DESCRIPTION OF DRAWINGS

FIG. 1 is a diagram illustrating a schematic structure of an electrochromic device.

FIG. 2 is a graph showing charge density of an ion storage layer according to one embodiment of the present application.

FIGS. 3 and 4 are graphs showing a drive evaluation on an electrochromic device according to one embodiment of the present application.

MODE FOR DISCLOSURE

Hereinafter, the present specification will be described in more detail.

In the present specification, a description of a certain member being placed "on" another member includes not only a case of the one member adjoining the another member but a case of still another member being present between the two members.

One embodiment of the present specification provides an electrochromic device including a substrate; a first electrode provided on the substrate; an ion storage layer provided on the first electrode; a polymer electrolyte layer provided on the ion storage layer; an electrochromic layer provided on the polymer electrolyte layer; and a second electrode provided on the electrochromic layer, wherein the ion storage layer includes $Mo_aTi_bO_xN_y$, and a, b, x and y are the same as or different from each other and each independently a real number of greater than or equal to 0.5 and less than or equal to 60. The $Mo_aTi_bO_xN_y$ material has superior durability under a high voltage compared to $WO_3$, LNO and $NiO_x$ that are existing electrochromic materials, and compared to existing electrochromic materials having surface resistance of a few MΩ/sq, the $Mo_aTi_bO_xN_y$ material has superior electrical conductivity at a level of 100 Ω/sq to 1000 Ω/sq, which is effective in improving a switching time.

The electrochromic device according to one embodiment of the present specification has high charge density and excellent durability, and electrochromism with a transmittance change of up to 30% may be obtained even under a condition of ±5 V or greater.

Specifically, the electrochromic device according to examples to describe below exhibits charge density of 60 mC/cm² or greater when forming the ion storage layer to a thickness of 240 nm using $MoTiO_xN_y$ under a voltage of ±5 V.

In one embodiment of the present specification, materials known in the art may be used as the substrate. Specifically, glass, plastic and the like may be used as the substrate, however, the substrate is not limited thereto.

In one embodiment of the present specification, a transparent substrate may be used as the substrate. In one embodiment, those having transmittance of 60% or higher in a visible region may be used as the substrate. In another embodiment, those having transmittance of 80% or higher in a visible region may be used as the substrate.

In one embodiment of the present specification, glass having transmittance of 80% or higher may be used as the substrate.

In one embodiment of the present specification, the first electrode and the second electrode are not particularly limited as long as they are known in the art. In one embodiment, the first electrode and the second electrode may each independently include indium doped tin oxide (ITO), antimony doped tin oxide (ATO), fluorine doped tin oxide (FTC)), indium doped zinc oxide (IZO), ZnO and the like, but are not limited thereto.

In one embodiment of the present specification, the first electrode and the second electrode may each be a transparent electrode. Specifically, ITO having transmittance of 80% or greater may be used.

In one embodiment of the present specification, the first electrode and the second electrode each independently have a thickness of 10 nm to 500 nm.

In one embodiment of the present specification, the ion storage layer includes $Mo_aTi_bO_xN_y$, and a, b, x and y are the same as or different from each other and each independently a real number of greater than or equal to 0.5 and less than or equal to 60. In one embodiment, a and b have the same value. In another embodiment, a and b are each 1.

In one embodiment of the present specification, a, b, x and y satisfy the following Equation (1) and Equation (2).

$$0.5 < \frac{a}{b} < 1.5 \quad (1)$$

$$0.1 < \frac{x}{y} < 5 \quad (2)$$

When the a/b value is greater than 0.5 and less than 1.5, the transmittance may be secured at 30% or higher when the $Mo_aTi_bO_xN_y$ layer is deposited to a thickness of 20 nm or greater, which is suited to be used as an electrochromic device. In addition, when the x/y value is greater than 0.1 and less than 5, the oxygen content is sufficient when the $Mo_aTi_bO_xN_y$ layer is deposited to a thickness of 20 nm or greater, and the transmittance may be secured at a certain level or higher.

In one embodiment of the present specification, the ion storage layer may further include, in addition to the $Mo_aTi_bO_xN_y$, LNO, $NiO_{x1}$ (1.0<x1<1.5), $NiCrO_{x2}N_{y2}$ (3<x2<6, 0.02<y2<0.06) and the like.

In one embodiment of the present specification, the ion storage layer has a thickness of greater than or equal to 20 nm and less than or equal to 100 nm.

In one embodiment of the present specification, the ion storage layer has a refractive index of 1.8 to 2.9 at a 550 nm wavelength.

In one embodiment of the present specification, the polymer electrolyte layer may be prepared using materials and methods known in the art. Specifically, a pentaerythritol triacrylate (PETA) monomer, 1 M or higher $LiClO_4$, polycarbonate (PC) and the like may be used, however, the material and the method are not limited thereto.

In one embodiment, the polymer electrolyte layer may include a lithium salt, a plasticizer, an oligomer, a monomer, an additive, a radical initiator and the like. The oligomer used in the present disclosure needs to have compatibility with the plasticizer.

In one embodiment of the present specification, as the method for forming the polymer electrolyte layer, a preparation method including, for example, forming an electrolyte film by coating an electrolyte solution on a first release film, then laminating a second release film thereto and UV curing the result, transferring the electrolyte film on a first electrochromic unit after removing the first release film, and laminating a second electrochromic unit on the electrolyte film after removing the second release film may be used.

As the first release film and the second release film, materials known in the art may be used.

The polymer electrolyte composition may have viscosity of 10 cps to 100,000 cps, and 1,000 cps to 5,000 cps based on 25° C. When the viscosity of the electrolyte solution satisfies the above-mentioned range, coating processability is excellent, and mixing process and defoaming process defects are prevented making film type coating simple.

In one embodiment of the present specification, the polymer electrolyte layer has a thickness of each independently 10 μm to 500 μm.

In one embodiment of the present specification, the electrochromic layer includes an oxide including tungsten (W).

In one embodiment of the present specification, the electrochromic layer includes an oxide including tungsten (W), and may further include chromium (Cr), manganese (Mn), niobium (Nb) or the like.

In one embodiment of the present specification, the electrochromic layer may include a thin film including an oxide including tungsten (W). In one embodiment, the thin film may have density of 1 g/cm³ to 4 g/cm³.

In one embodiment of the present specification, the oxide including tungsten (W) may be represented by a chemical formula of $WO_z$, and z is a real number of greater than or equal to 1 and less than or equal to 3.

In one embodiment, the oxide including tungsten (W) is tungsten trioxide ($WO_3$).

In one embodiment of the present specification, the electrochromic layer has a thickness of greater than or equal to 10 nm and less than or equal to 1 μm.

In one embodiment of the present specification, the electrochromic layer may be formed using methods known in the art. In addition, the electrochromic layer may also be formed using a method for manufacturing an electrochromic device to describe below.

In one embodiment of the present specification, the electrochromic device described above may be further provided with a film on the second electrode. In one embodiment, optical films generally known in the art may be used without limit as the film.

Specifically, triacetylcellulose, polyethylene terephthalate, polymethyl methacrylate, polycarbonate, acryl-based resins and the like may be used as the film material, and proper materials may be selected depending on the condition of the electrochromic device and unique properties of the optical film material.

In one embodiment of the present specification, those having a thickness of greater than or equal to 50 μm and less than or equal to 200 μm may be used as the film. In addition, in one embodiment of the present specification, those having light transmittance of 70% or higher may be used as the film.

Another embodiment of the present disclosure provides a method for manufacturing an electrochromic device including forming a first electrode on a substrate; forming an ion storage layer on the first electrode; forming an electrochromic layer on a second electrode; and forming a polymer electrolyte layer between the ion storage layer and the electrochromic layer, wherein the ion storage layer includes $Mo_aTi_bO_xN_y$, and a, b, x and y are the same as or different from each other and each independently a real number of greater than or equal to 0.5 and less than or equal to 60.

In one embodiment of the present specification, the forming of a first electrode on a substrate may use methods known in the art. For example, sputtering, electron beam deposition, chemical vapor deposition, a sol-gel coating method may be used on the substrate material described above for the formation, however, the method is not limited thereto.

In one embodiment, a first electrode may be formed on a substrate using direct current sputtering (DC sputtering).

As for an ion storage layer used in an electrochromic device, lithium ion intercalation and deintercalation are difficult as thin film density increases, which becomes a factor inhibiting electrochromism efficiency. Accordingly, a process under a vacuum condition is suited so as to increase porosity of a thin film.

The forming of an ion storage layer and the forming of an electrochromic layer may use the same method as the forming of a first electrode described above.

In one embodiment of the present specification, the forming of an ion storage layer and the forming of an electrochromic layer may be conducted using a vacuum deposition method or direct current sputtering (DC sputtering).

In one embodiment of the present specification, the forming of a polymer electrolyte layer may include forming a polymer electrolyte film by coating a polymer electrolyte solution on a first release film, then laminating a second release film thereto and UV curing the result, transferring the polymer electrolyte film on a first electrochromic unit after removing the first release film and, and laminating a second electrochromic unit on the polymer electrolyte film after removing the second release film.

As the first release film and the second release film, materials and methods known in the art may be used.

In another embodiment of the present disclosure, the forming of a polymer electrolyte layer may include forming a polymer electrolyte film by coating a polymer electrolyte solution on the electrochromic layer and UV curing the result; and laminating the ion storage layer on the electrolyte film.

In one embodiment of the present specification, the pentaerythritol triacrylate (PETA) monomer, the 1 M or higher $LiClO_4$, the polycarbonate (PC) and the like described above may be used as the polymer electrolyte layer, and the polymer electrolyte layer may further include a lithium salt, a plasticizer, an oligomer, a monomer, an additive, a radical initiator and the like.

In one embodiment of the present specification, the method for manufacturing an electrochromic device may cite the descriptions on the electrochromic device provided above.

The following examples are for illustrative purposes only, and the scope of the present disclosure is not limited thereto.

Comparative Example 1

On TCO, $WO_3$ was deposited to a thickness of 300 nm as an electrochromic layer using a direct current sputtering method. On another TCO, $LiNiO_x$ was deposited to a thickness of 100 nm as an ion storage layer using a direct current sputtering method. The electrochromic layer and the ion storage layer were laminated using a gel polymer electrolyte to manufacture an electrochromic device.

Example 1

An electrochromic device was manufactured in the same manner as in Comparative Example 1 except that $Mo_aTi_bO_xN_y$ was deposited to a thickness of 50 nm as the ion storage layer. Each of the electrochromic devices of Comparative Example 1 and Example 1 went through electrochromic drive using a potentiostat apparatus, and optical properties were each measured using a UV-Vis spectrometer.

<Charge Density Evaluation>

Charge density of the electrode was measured using a potentiostat, and herein, a solution dissolving 1 mole of lithium perchlorate ($LiClO_4$) in a propylene carbonate (PC) solvent was used as the electrolyte, and PSCA was measured using the electrochromic material to evaluate as a working electrode, Pt as a counter electrode, and an Ag/AgCl wire as a reference electrode. The potential step chrono amperometry (PSCA) is repeating a constant voltage going in one direction at a constant speed and then changing the direction, and a current corresponding to a voltage applied to the electrode herein was measured. When applying potential from the outside, an electrolytic current flows, and this current decreases over time, and ultimately becomes 0 after a long period of time. The method of examining current-time obtained by such a potential step is potential step chrono amperometry. When applying potential from the outside, an electrolytic current flows, and this current decreases over time, and ultimately becomes 0 after a long period of time.

FIG. 2 is a graph showing charge density of the ion storage layer according to one embodiment of the present application. When referring to FIG. 2, it was seen that charge density of the ion storage layer was most superior under the condition of ±5 V or higher.

<Drive Evaluation on Electrochromic Device>

For the electrochromic device including the ion storage layer including $MoTiO_xN_y$ according to one embodiment of the present application, a current was measured by repeating a −5 V to +5 V section a few times at a rate of recording step 1 sec depending on a driving voltage section. Based on the graph obtained herein, coloring, bleaching peak currents and charge quantity were calculated. The area of the current-time profile was the charge quantity of the electrochromic material to evaluate, and the coloring, bleaching times were based on the 80% current amount with respect to the peak current.

FIGS. 3 and 4 are graphs showing drive evaluation on the electrochromic device according to one embodiment of the present application. When referring to FIG. 3, it was seen that the electrochromic device according to one embodiment of the present application had excellent durability since a constant current value was maintained over time. In addition, when referring to FIG. 4, it was seen that the electrochromic device according to one embodiment of the present application had the electrochromic time decreasing by 10 times or greater compared to existing devices since low resistance properties of the electrochromic material were added when driving the device at a high voltage.

The invention claimed is:

1. An electrochromic device, comprising:
a substrate;
a first electrode provided on the substrate;
an ion storage layer provided on the first electrode;
a polymer electrolyte layer provided on the ion storage layer;
an electrochromic layer provided on the polymer electrolyte layer; and
a second electrode provided on the electrochromic layer,
wherein the ion storage layer includes $Mo_aTi_bO_xN_y$, wherein a, b, x and y are the same as or different from each other and each independently is a real number of greater than or equal to 0.5 and less than or equal to 60.

2. The electrochromic device of claim 1, wherein the ion storage layer has a thickness of greater than or equal to 20 nm and less than or equal to 100 nm.

3. The electrochromic device of claim 1, wherein the ion storage layer has a refractive index of 1.8 to 2.9 at a 550 nm wavelength.

4. The electrochromic device of claim 1, wherein a and b satisfy the following Equation (1) and x and y satisfy the following Equation (2):

$$0.5 < \frac{a}{b} < 1.5 \quad (1)$$

$$0.1 < \frac{x}{y} < 5. \quad (2)$$

5. The electrochromic device of claim 1, wherein the electrochromic layer includes an oxide including tungsten (W).

6. The electrochromic device of claim 1, wherein the electrochromic layer has a thickness of greater than or equal to 20 nm and less than or equal to 1 μm.

7. The electrochromic device of claim 1, further comprising a film on the second electrode.

8. A method for manufacturing an electrochromic device comprising:
forming a first electrode on a substrate;
forming an ion storage layer on the first electrode;
forming an electrochromic layer on a second electrode; and
forming a polymer electrolyte layer between the ion storage layer and the electrochromic layer,
wherein the ion storage layer includes $Mo_aTi_bO_xN_y$, wherein a, b, x and y are the same as or different from each other and each independently is a real number of greater than or equal to 0.5 and less than or equal to 60.

9. The method for manufacturing an electrochromic device of claim 8, wherein the forming of an ion storage layer and the forming of an electrochromic layer are conducted using a vacuum deposition method or direct current sputtering (DC sputtering).

10. The method for manufacturing an electrochromic device of claim 8, wherein a and b satisfy the following Equation (1) and x and y satisfy the following Equation (2):

$$0.5 < \frac{a}{b} < 1.5 \quad (1)$$

$$0.1 < \frac{x}{y} < 5. \quad (2)$$

11. The method for manufacturing an electrochromic device of claim 8, wherein the electrochromic layer includes an oxide including tungsten (W).

12. The electrochromic device of claim 1, wherein the ion storage layer has a thickness of greater than or equal to 20 nm and less than or equal to 240 nm.

* * * * *